(12) United States Patent
Shroff et al.

(10) Patent No.: US 12,339,969 B2
(45) Date of Patent: Jun. 24, 2025

(54) SYSTEM METHOD FOR FRACTIONAL SECURE BOOT BY VALIDATING SECURE ENCLAVE USING INSTRUCTIONS OF PRE-DRIVERS STORED IN MEMORY BY MANUFACTURER

(71) Applicant: Cisco Technology, Inc., San Jose, CA (US)

(72) Inventors: Chirag K Shroff, Cary, NC (US);
William F. Sulzen, Apex, NC (US);
Ofer Licht, Scotts Valley, CA (US);
Chandan Singh, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 195 days.

(21) Appl. No.: 18/339,017

(22) Filed: Jun. 21, 2023

(65) Prior Publication Data
US 2024/0427896 A1  Dec. 26, 2024

(51) Int. Cl.
*G06F 9/00* (2018.01)
*G06F 9/445* (2018.01)
*G06F 21/57* (2013.01)

(52) U.S. Cl.
CPC ........ *G06F 21/575* (2013.01); *G06F 9/44505* (2013.01)

(58) Field of Classification Search
CPC .................... G06F 21/575; G06F 9/44505
See application file for complete search history.

(56) References Cited

U.S. PATENT DOCUMENTS

| | | | |
|---|---|---|---|
| 9,246,690 B1* | 1/2016 | Roth | G06F 21/53 |
| 9,971,895 B2* | 5/2018 | Rhee | G06F 21/64 |
| 11,347,857 B2* | 5/2022 | Fu | H04L 9/3268 |
| 12,072,982 B2* | 8/2024 | Suryanarayana | G06F 21/572 |
| 2005/0010767 A1* | 1/2005 | Craft | G06F 21/123 |
| | | | 713/168 |

(Continued)

OTHER PUBLICATIONS

Yueqiang Cheng, "Virtualization-based System Hardening against Untrusted Kernels." pp. 1-179. Https://ink.library.smu.edu.sg/etd_coll/105 (Year: 2014).*

(Continued)

*Primary Examiner* — Tammara R Peyton
(74) *Attorney, Agent, or Firm* — Polsinelli P.C.

(57) ABSTRACT

Disclosed are systems, apparatuses, methods, and computer-readable media for configuring network groups without software-based processing and management. A method includes: validating veracity of a secure enclave based on a secure identify of the secure enclave using the instructions of a secure enclave predriver stored in a memory integral to a processor; establishing a secure connection with the secure enclave; retrieving at least one authentication key from the secure enclave; retrieving at least a portion of a bootstrapper from a secure storage based on the instructions of the secure enclave predriver; validating a veracity of the bootstrapper based on the at least one authentication key; initializing an external memory using the instructions of the bootstrapper; copying a bootloader from the secure storage into the external memory; validating a veracity of the bootloader based on the at least one authentication key; and executing the bootloader.

20 Claims, 11 Drawing Sheets

(56) References Cited

U.S. PATENT DOCUMENTS

2009/0271620 A1\* 10/2009 Sudhakar ............ H04L 63/0823
　　　　　　　　　　　　　　　　　　　　　　713/164
2016/0232356 A1\* 8/2016 Barkelew .............. G06F 9/4401
2019/0007216 A1　 1/2019 Meriac
2021/0312057 A1　10/2021 Kloth
2021/0406380 A1　12/2021 Poulard et al.
2022/0198018 A1　 6/2022 Wentz et al.
2022/0245255 A1　 8/2022 Hinnershitz et al.
2024/0419802 A1\* 12/2024 Edwards ............... G06F 21/575

OTHER PUBLICATIONS

Vincent Zimmer, "System Isolation Beyond BIOS using the Unified Extensible Firmware Interface." Security and Management, Intel Corporation, pp. 1-7 (Year: 2008).\*

Apple: "Apple Platform Security", May 2022, pp. 1-210.

\* cited by examiner

SYSTEM METHOD FOR FRACTIONAL SECURE BOOT BY VALIDATING SECURE ENCLAVE USING INSTRUCTIONS OF PRE-DRIVERS STORED IN MEMORY BY MANUFACTURER

TECHNICAL FIELD

The disclosure relates generally to communication networks and, more specifically but not exclusively, to a systems and techniques for securely booting devices.

DESCRIPTION OF THE RELATED TECHNOLOGY

Secure bootloaders ensure the integrity and security of the boot process and the subsequent execution of software on a device. However, there can be certain problems associated with secure bootloaders such as accidental leaking of production keys and development keys. Managing multiple keys for different stages of the development and production lifecycle can be challenging. Proper key storage, rotation, and distribution mechanisms must be in place to prevent unauthorized access or misuse of keys. In addition, there are other issues with key management, such as lack of key separation, unauthorized firmware updates, and lack of revocation mechanisms.

In some cases, keys can be revoked by blowing an electronic fuse (e-fuse) that permanently disconnects the key in the e-fuse from a hardware circuit. The number of e-fuses is limited and can brick and electronic device if all e-fuses are blown. It is essential to have robust key management practices, including secure key storage, proper key separation between development and production environments, and effective key revocation mechanisms. Additionally, continuous monitoring and auditing of the bootloader and key management processes can help identify and mitigate potential security issues.

BRIEF DESCRIPTION OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
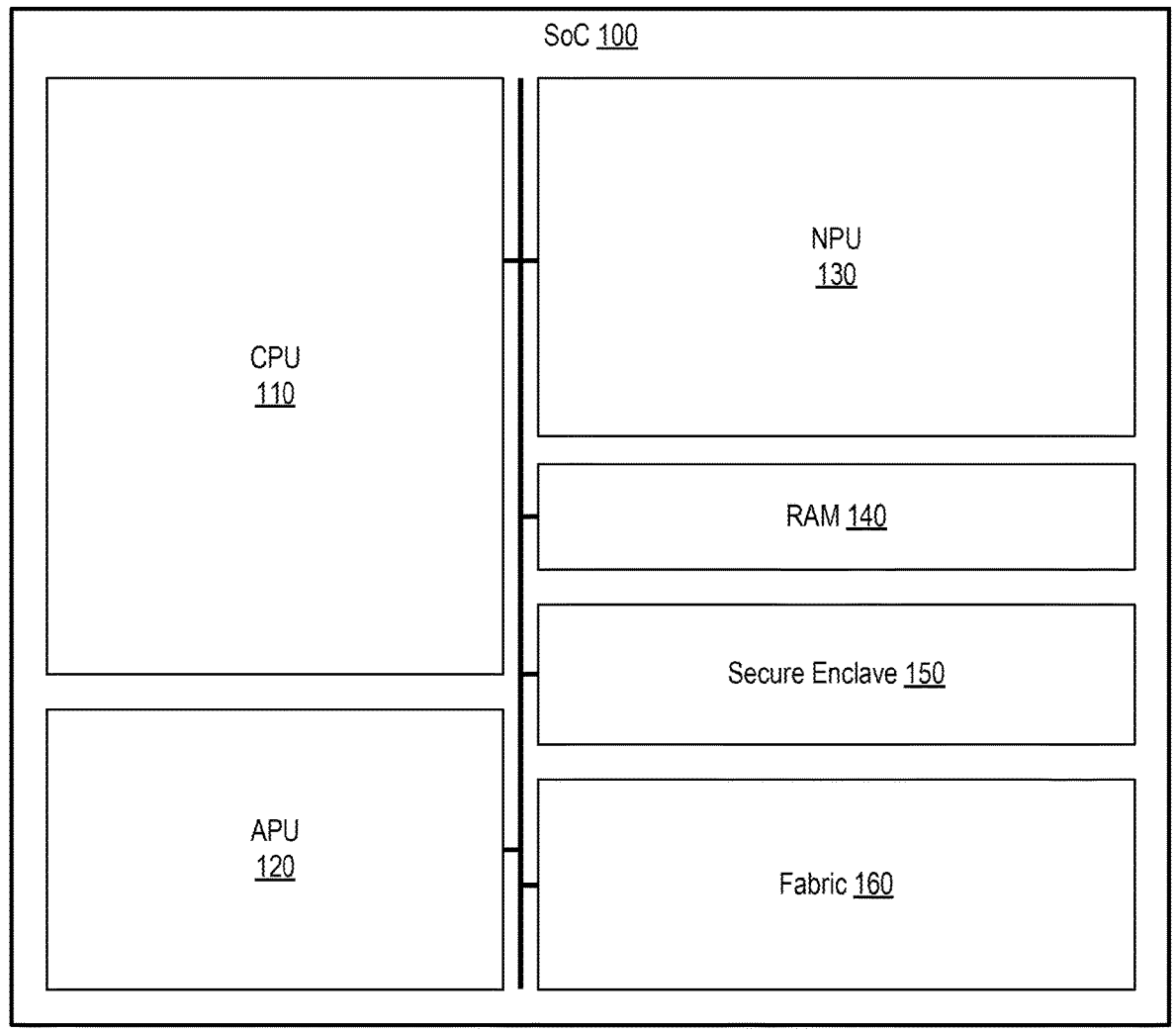
FIG. 1. is a block diagram of an example system on chip (SoC) in accordance with some aspects of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Overview

Disclosed are systems, apparatuses, methods, computer readable medium, and circuits for booting a system. According to at least one example, a method includes: validating veracity of a secure enclave based on a secure identify of the secure enclave using the instructions of a secure enclave predriver stored in a memory integral to a processor; establishing a secure connection with the secure enclave based on the veracity of the secure enclave using instructions of the secure enclave predriver; retrieving at least one encryption key from the secure enclave based on the instructions of the secure enclave predriver; retrieving at least a portion of a bootstrapper from a secure storage based on the instructions of the secure enclave predriver; validating a veracity of the bootstrapper based on the at least one encryption key; initializing an external memory using the instructions of the bootstrapper, wherein the external memory is connected to the processor; copying a bootloader from the secure storage into the external memory based on the instructions in the bootstrapper or the secure enclave predriver; validating a veracity of the bootloader based on the at least one encryption key; clearing the at least one encryption key from the memory of the processor; executing the bootloader to load a least a portion of an operating system into the external memory. For example, a system on Chip (SoC) validates veracity of a secure enclave based on a secure identify of the secure enclave using the instructions of a secure enclave predriver stored in a memory integral to a processor; establishes a secure connection with the secure enclave based on the veracity of the secure enclave using instructions of the secure enclave predriver; retrieves at least one encryption key from the secure enclave based on the instructions of the secure enclave predriver; retrieves at least a portion of a bootstrapper from a secure storage based on the instructions of the secure enclave predriver; validates a veracity of the bootstrapper based on the at least one encryption key; initializes an external memory using the instructions of the bootstrapper, wherein the external memory is connected to the processor; copies a bootloader from the secure storage into the external memory based on the instructions in the bootstrapper or the secure enclave predriver; validates a veracity of the bootloader based on the at least one encryption key; clears the at least one encryption key from the memory of the processor; executes the bootloader to load a least a portion of an operating system into the external memory.

In another example, a SoC for booting a system is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the SoC to: validate veracity of a secure enclave based on a secure identify of the secure enclave using the instructions of a secure enclave predriver stored in a memory integral to a processor; establish a secure connection with the secure enclave based on the veracity of the secure enclave using instructions of the secure enclave predriver; retrieve at least one encryption key from the secure enclave based on the instructions of the secure enclave predriver; retrieve at least a portion of a bootstrapper from a secure storage based on the instructions of the secure enclave predriver; validate a veracity of the bootstrapper based on the at least one encryption key; initialize an external memory using the instructions of the bootstrapper, wherein the external memory is connected to the processor; copy a bootloader from the secure storage into the external memory based on the instructions in the bootstrapper or the secure enclave predriver; validate a veracity of the bootloader based on the at least one encryption key; clear the at least one encryption key from the memory of the processor; execute the bootloader to load a least a portion of an operating system into the external memory.

Example Embodiments

In some aspects, a processor (e.g., a controller, a central processing unit (CPU), etc.) implements a boot process to initialize and stage hardware components to enable the processor to access an operating system and boot the operating system. In some cases, CPUs may use a Trusted Platform Module (TPM) module to authenticate the device to prevent malicious parties from intervening in the boot process to steal content. Booting with a TPM begins which a power-on self-test (POST) during which the CPU performs a series of diagnostic checks to ensure that all hardware components are functioning correctly. Once this is complete, the CPU searches for a bootable device, such as a hard drive or a solid-state drive (SSD), and loads the initial bootloader.

The CPU verifies the integrity of the bootloader and any subsequent firmware or operating system images using the TPM module. The TPM stores cryptographic keys and other security-related data that are used to authenticate and verify the boot process. If the boot loader or firmware is compromised or has been tampered with, the during system authentication functions that are executed in the CPU, the TPM can provide a signal to the CPU that indicates an error, and the boot process will be halted. After the CPU and the TPM verify the system has not been compromised, the CPU loads the operating system and any additional applications or services. During this stage, the TPM may continue to monitor the system for any signs of tampering or unauthorized access. If any security breaches are detected, the TPM may alert the user or system administrator and take appropriate action, such as shutting down the system or locking out unauthorized users.

The authentication keys are generally stored in an electronic fuse (e-fuse) that allows a CPU to select different authentication keys. However, CPU vendors implement a form of revocation of an authentication key by creating multiple key slots in e-fuses and revoking keys. In the event of a key comprises, CPU vendors revoke the key by blowing an e-fuse which prevents that authentication key from being accessed. However, there is a limited number of times the keys may be revoked because the e-fuses are finite. In addition, support for different keys such as release and development is a challenge as there is no ability to inject development keys on a per-device basis that reduces the risk of a development key being accidentally distributed in a release.

Examples are described herein in the context of systems and methods for configuring network groups without software-based processing and management. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In some aspects, a secure enclave predriver (or predriver) enables support for the revocation of keys in the event of a compromise without affecting the longevity of the system. In some cases, a secure enclave predriver is disclosed that is configured to enable the loading of contents securely into processor memory during a secure boot and validating the different components without accessing external memory. In some cases, the bootstrapper, which is an intermediary set of instructions that configure a system to execute more general instructions, may be separated from instructions that configure a processor to initialize states of an external memory such as a double data rate (DDR) memory, which is referred to as memory initialization instructions. In some cases, the memory initialization instructions may consume a significant amount of space and, when combined with bootstrapping code, may be larger than a single addressable memory within the processor. For example, a bootstrapper and memory initialization instructions may be larger than 128 kilobytes (kB) and not be able to fit within a 128 KB synchronous random access memory (SRAM) of a processor. In some cases, the predriver may be separate instructions that assist in securely configuring memory operations prior to and during bootstrapper operations and memory initialization. After the memory is initialized, the external memory, which has more capacity than a processor, is available and an operating system may be loaded from non-volatile storage into the external memory to begin booting of the operating system.

FIG. 1. is a block diagram of an example SoC 100 in accordance with some aspects of the disclosure. In some aspects, an SoC 100 is a semiconductor device that is manufactured and configured to include various components to integrate functions within the SoC to reduce delays associated with external interfaces and other impediments. For example, high-bandwidth video functions such as augmented and virtual reality may exceed the bandwidth of a DDR bus.

In one aspect, the SoC 100 may include at least one CPU 110 configured to execute software instructions. In some aspects, the CPU 110 comprises a plurality of processing cores that may be configured to execute the functionality in parallel, and the processing cores may have different configurations. For example, the CPU 110 may include a plurality of performance cores for low-latency functions and a plurality of efficiency cores that consume less power than the performance cores.

The SoC 100 may also include one or more accelerated processing units (APU) that are configured to perform specific functions, such as floating point math. Non-limiting examples of APU functions include a graphics processing unit (GPU) for video or mathematical operations, a neural network processing unit for performing neural network and vector-based operations, and so forth. In some aspects, the SoC 100 may also include programmable logic devices such as a network processing unit (NPU) 130. The NPU 130 may be programmable using the programming protocol-independent packet processors (P4) language, which is a domain-specific programming language for network devices for processing packets. In some aspects, the NPU 130 may have a distributed P4 NPU architecture that may execute at line rate for small packets with complex processing, and may also include optimized and shared NPU fungible tables.

In some aspects, the SoC 100 may also include a volatile memory such as a random access memory (RAM) 140 that is shared between the various components (e.g., CPU 110, APU 120, NPU 130, etc.). As an example, a GPU (e.g., implemented in the APU 120) and the CPU 110 may share access to the RAM 140.

The SoC 100 may also include a secure enclave 150 such as a TPM or a trusted anchor module (TAM) that is configured to secure the SoC 100 and identify any malicious issues. The secure enclave may include encryption generation functionality, a true random number generator, a secure storage medium, and so forth. In some cases, the SoC 100 may also be configured to interface with a security subsystem (not shown), such as a security module that is configured to securely store information that is not made available to the SoC 100. In one aspect, the security subsystem may securely store biometric information to enable various functions such as biometric authentication, etc.

The SoC 100 also includes a fabric 160 that is configured to facilitate interfacing the components of the SoC 100 internally and externally. As an example, the fabric 160 may include functionality to allocate the RAM 140 between the various shared components within the SoC 100. The SoC 100 may interconnect the various components using a bus to enable access to the various components, such as enabling the CPU 110 to address a portion of the RAM 140. In some aspects, the fabric 160 may also interface with external components such as a security sub-system, various bus interfaces (e.g., Peripheral Component Interconnect Express (PCI-e), thunderbolt, universal serial bus, a communication circuit for wireless communication, and so forth).

Figure 2:
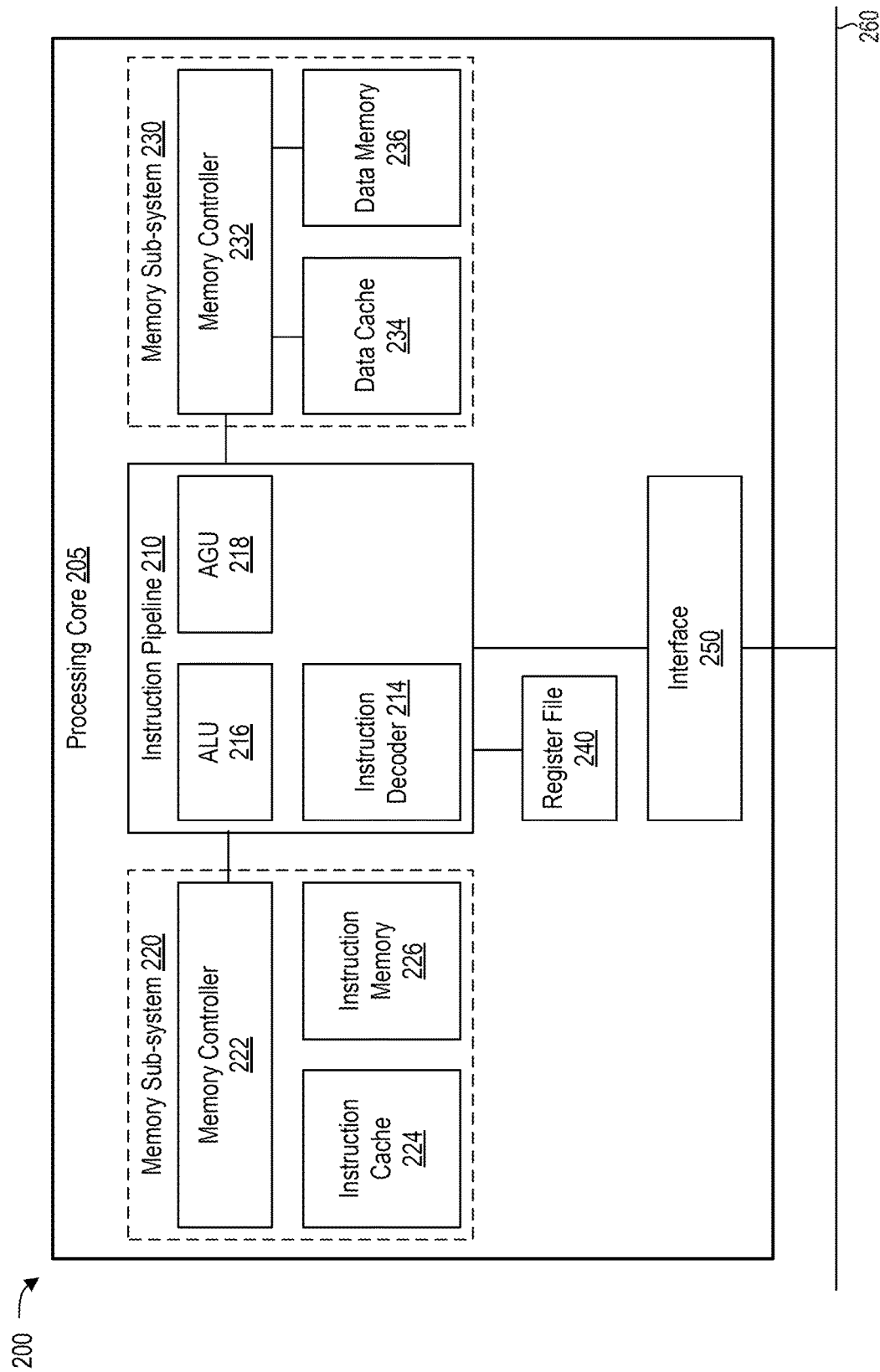
FIG. 2 is a block diagram of a processing core integrated into a SoC in accordance with an embodiment of the disclosure.

FIG. 2 is a block diagram of a semiconductor device in accordance with an embodiment of the disclosure. As illustrated in FIG. 2, the semiconductor device 200 includes a processing core 205 that is configured to decode instructions and perform operations associated with those instructions. In one aspect, the processing core 205 includes an instruction pipeline 210, a memory sub-system 220, a memory sub-system 230, and an interface 250. The instruction pipeline 210 is coupled to the main memory (not shown) via the system bus 260.

The processing core 205 is configured to access instructions and/or data that are stored in the main memory In this case, the processing core 205 is intended to be illustrative and alternative aspects may include other types of processors such as a GPU, a digital signal processor (DSP), a neural network processing unit (NNPU), APU, a co-processor, an applications processor, and the like in place of or in addition to the processing core 205. In one aspect, the processing core 205 includes at least one instruction pipeline 210 that is used to execute the instructions and/or manipulate the data.

The instruction pipeline 210 is configured to access a register file 240 that includes registers that have different functions to perform instructions. In one aspect, an instruction decoder 214 decodes instructions to control an arithmetic logic unit (ALU) 216 based on the content in the register file 240. The instruction decoder 214 includes circuitry configured to control the ALU 216 to perform various machine-level instructions in conjunction with the registers in a register file 240. The instruction pipeline 210 also includes an address generation unit (AGU) 218 that is configured to determine addresses used by the processing core 205 to access main memory. The AGU 218 is a separate circuit that operates in parallel with the ALU 216 and the instruction decoder 214 to efficiently store and retrieve information in various memories of the processing core 205 or a system associated with the processing core 205 (e.g., from main memory).

The instruction pipeline 210 also implements a hierarchical (or multilevel) cache system that is used to speed access to the instructions and/or data by storing selected instructions and/or data in the caches. However, persons of ordinary skill in the art having the benefit of the present disclosure should appreciate that alternative embodiments of the semiconductor device 200 may implement different configurations of the instruction pipeline 210, such as configurations that use external caches. Moreover, the techniques described in the present application may be applied to other processors such as GPUs, APUs, and the like.

The memory sub-system 220 includes a memory controller 222, an instruction cache 224, and an instruction memory 226. The instruction cache 224 and instruction memory 226 are used as L1 instruction (L1-I) memories. The memory sub-system 230 includes a memory controller 232, a data cache 234, and a data memory 236. The data cache 234 and data memory 236 are used as L1 data (L1-D) memories. In some aspects, the data cache 234, data memory 236, instruction cache 224 (e.g., I-cache), and instruction memory 226 (e.g., I-memory) may be implemented by SRAMs. In some embodiments, the data memory 236 and instruction memory 226 may be tightly coupled memories (TCMs).

The main memory (e.g., the RAM 140 in FIG. 1) may be implemented by a dynamic random access memory (DRAM) which has a larger memory capacity, a longer access time, and higher power consumption than the data cache 234, and the data memory 236. The storage device may be a non-volatile memory such as a hard-disk drive (HDD), an SSD, a flash memory, or a read-only memory, but the disclosure is not limited thereto.

The data memory 236 and the data cache 234 may be equal or different from each other in size. For example, the data cache 234 has a first range of logical addresses, and the data memory 236 has a second range of logical addresses. The first range is independent of the second range and does not overlap the second range. In an embodiment, the first range may be followed by the second range, and the logical addresses in the first range and those in the second range are consecutive. For example, the first range may be from address 0 to address M−1, and the second range may be from address M to address N−1, where M and N are positive integers, and N is greater than M. Alternatively, addresses in the first range and the second range are not consecutive.

Similarly, the instruction memory 226 and the instruction cache 224 may be equal or different from each other in size. For example, the instruction cache 224 has a third range of logical addresses, and the instruction memory 226 has a fourth range of logical addresses. The third range is independent of the fourth range and does not overlap the fourth range. In an embodiment, the third range is followed by the fourth range, and the third range and the fourth range are consecutive in logical addresses. For example, the third range may be from address 0 to address P−1, and the second range may be from address P to address Q−1, where P and Q are positive integers, and Q is greater than P. Alternatively, addresses in the third range and the fourth range are not consecutive.

The memory controller 222 may be regarded as an L1 instruction-side controller. The memory controller 222 is configured to control the activation and deactivation of instruction cache 224 and the instruction memory 226 in response to a program address and content information stored in a program counter. For example, the memory controller 222 may activate the instruction cache 224 and/or the instruction memory 226 according to the program address and content information stored in the program counter and fetch an instruction from either the instruction cache 224 or the instruction memory 226. For example, the content information stored in the program counter may include the memory information. The memory information may indicate whether to activate either the instruction cache 224 or the instruction memory 226 in the instruction-fetch (IF) stage of the current instruction, and the memory information may be expressed by a two-bit value such as 2'b00, 2'b01, 2'b10, or 2'b11, where the most significant bit of the two-bit value indicates whether to activate the instruction cache 224 and the least significant bit of the two-bit value indicates whether to activate the instruction memory 226.

The memory controller 232 may be regarded as an L1 data-side controller. The memory controller 232 is configured to control access to data cache 234 and the data memory 236 in response to an access command from the AGU 218 in the processing core 205. The memory controller 232 is further configured to control the activation and deactivation of the data memory 236 and data cache 234. In an embodiment, either the data memory 236 or the data cache 234 is activated by the memory controller 232 according to the address information and content information of the currently executed instruction from the address generator. In an embodiment, the memory controller 232 and memory controller 232 may include the function of a memory management unit (MMU) or a memory protection unit (MPU) that is capable of performing the translation of virtual memory addresses to physical addresses.

The register file 240 is an array of processor registers in the instruction pipeline 210. For example, the register file 240 may include a predetermined number of registers, and each register has a fixed width, where the predetermined number and width of registers depend on the architecture of the instruction pipeline 210. In an embodiment, the registers in the register file 240 may be general-purpose registers that store intermediate result data processed by the execution units of the instruction pipeline 210. Alternatively or additionally, the registers in the register file 240 may further include a stack pointer, a link register, a program counter (PC), a current program status register (CPSR), banked registers, etc., but the disclosure is not limited thereto.

In some aspects, each register in the register file 240 further includes content information in addition to the original register value for its intended purpose. For example, the content information includes memory information and distance information. The memory information may indicate whether to activate either the data cache 234 or the data memory 236 in the execution stage of the current instruction, and the memory information may be expressed by a two-bit value such as 2'b00, 2'b01, 2'b10, or 2'b11, where the most significant bit of the two-bit value indicates whether to activate the data cache 234 and the least significant bit of the two-bit value indicates whether to activate the data memory 236.

Given that the two-bit value of the memory information is 2'b11, the memory controller 232 may activate both the data cache 234 and the data memory 236 while performing the memory-access operation of the current instruction. For example, the memory information of 2'b11 may be used for the initial condition because the memory controller 232 cannot determine whether the address to be accessed is located within the data cache 234 or the data memory 236. Given that the two-bit value of the memory information is 2'b10, the memory controller 232 may activate the data cache 234 and deactivate the data memory 236 while performing the memory-access operation of the current instruction. Given that the two-bit value of the memory information is 2'b01, the memory controller 232 may activate the data memory 236 and deactivate the data cache 234 upon performing the memory-access operation of the current instruction. Given that the two-bit value of the memory information is 2'b00, the memory controller 232 may deactivate both the data memory 236 and data cache 234 since the current instruction does not require access to the memory.

The distance information may indicate whether the distance from the current address to the boundary of the data cache 234 is more than a predetermined length such as 32 bytes, but the disclosure is not limited thereto. The distance information may be expressed by a 2-bit value that may help determine whether the address of the next instruction is located within the data cache 234 or the data memory 236.

In some aspects, the content information may be changed due to arithmetic instructions (e.g., ADD, SUB, MPY, DIV, etc.), logic instructions (e.g., AND, OR, XOR, etc.), register-movement instructions, or memory-access instructions.

The instruction pipeline 210 may be divided into four stages such as an IF stage, an instruction-decode (ID) stage, an execution (EX) stage, and a write-back (WB) stage. The stages are arranged so that a new instruction is stored in an input register of each stage and the result calculated in that stage is stored in an input register of a subsequent stage. For example, in the IF stage of the current instruction, the processing core 205 may read the program address stored in the program counter PC, and then fetch the current instruction from either the instruction cache 224 or instruction memory 226 into the instruction register (not shown) according to the program address stored in the program counter. In an embodiment, the program counter may be one of the registers in the register file 240, or a standalone register.

In an embodiment, the program counter also includes the content information in addition to the program address. For example, the content information stored in the program counter may indicate whether to activate and deactivate the instruction cache 224 and/or the instruction memory 226 in the IF stage of the current instruction. In addition, the memory controller 222 may determine whether to activate and deactivate the instruction cache 224 and/or the instruction memory 226 in the IF stage of the current instruction according to both the program address and content information stored in the program counter, where the details will be described later.

During the ID stage, an instruction decoder 214 of the processing core 205 may decode the fetched instruction, retrieve operands associated with the decoded instruction from one or more registers in the register file 240, and write the retrieved operands to one or more instruction registers.

During the EX stage, the processing core 205 and the memory controller 232 may retrieve the address of the current instruction from the instruction registers. For example, if the current instruction is a memory-access instruction, an AGU 218 of the processing core 205 may calculate the memory address for fetching data from the data cache 234 and/or data memory 236 by the memory controller 232. During the EX stage, the ALU 216 of the processing core 205 may also perform arithmetic operations (e.g., ADD, SUB, MPY, DIV, SHIFT, etc.) and/or logic operations (e.g., AND, OR, NOT, NAND, NOR, XOR, XNOR, etc.) of the currently executed instruction, and the operations that are performed may take one or more clock cycles depending on the type of the instruction. In addition, the memory controller 232 may generate the content information indicating whether to activate the data cache 234 and/or data memory 236 for the next instruction. The results of the EX stage and the calculation information are stored in a stage register.

During the WB stage, the memory controller 232 (or the processing core 205) may update the value stored in the register to an associated register in the register file 240. It should be noted that the registers in the register file 240 may include the updated content information after the WB stage, and the registers with the updated content information in the register file 240 may be used in the EX stage of the next instruction or an instruction performed later. In one aspect, a forwarding path for the registers with the updated content information, so that the content information updated in the WB stage (e.g., the fourth stage) of the instruction currently being performed may be used in the EX stage (e.g., the third stage) of the next instruction or an instruction performed later. In some aspects, there is another forwarding path between inputs and the register (e.g., a stage register) storing the results of the EX stage and the content information. As an example, during the EX stage, the memory controller 232 (or the processing core 205) may also write the calculated content information into the register, such that the value and content information stored in the register may be immediately used as inputs of the EX stage of the next instruction, thereby reducing possible stalling in the instruction pipeline 210.

Figure 3:
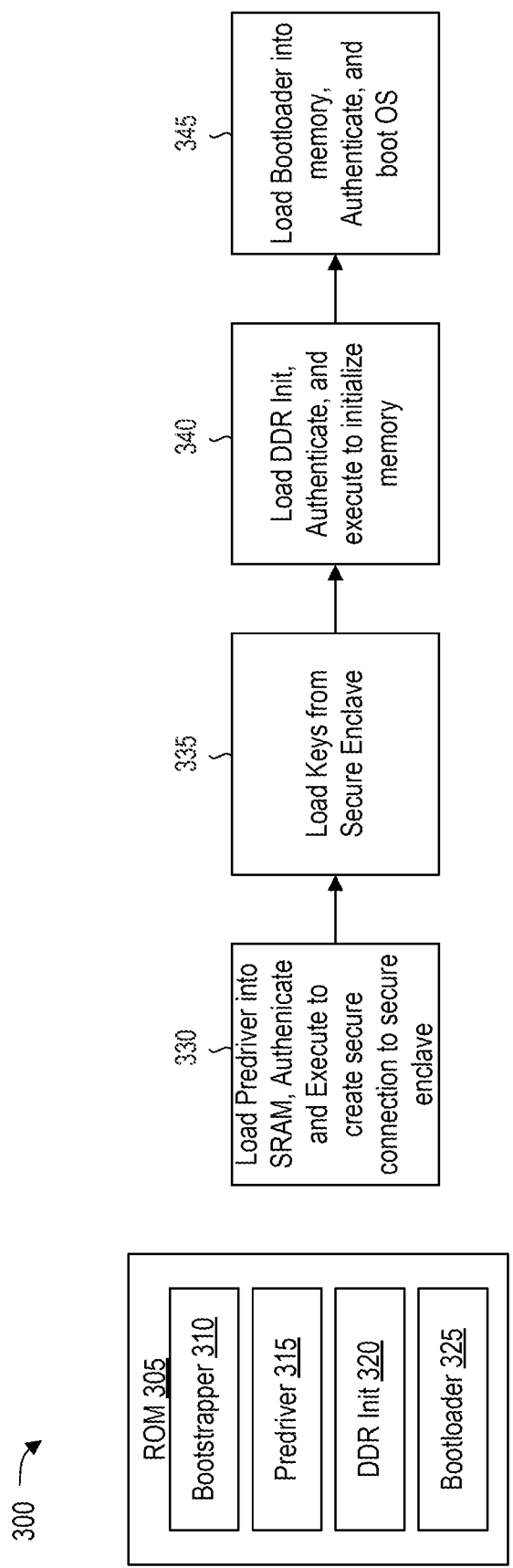
FIG. 3 is a conceptual diagram illustrating a boot operation using a predriver in accordance with some aspects of the disclosure.

FIG. 3 is a conceptual diagram 300 illustrating a boot operation using a predriver in accordance with some aspects of the disclosure. In some aspects, a read-only memory (ROM) 305 includes a bootstrapper 310, a predriver 315, a DDR initializer 320, and a bootloader 325. In some aspects, the bootstrapper 310, predriver 315, and DDR initializer 320 may be separate instructions or may be integral in various combinations. In some cases, the memory associated with a processing core may be limited as described in detail above, and the combined sizes of the bootstrapper 310, the predriver 315, and the DDR initializer 320 may be larger than a size of an SRAM. In this case, during boot, the various SRAMs in the processor cannot be accessed using a logical interface and, therefore, the bootstrapper 310, the predriver 315, the DDR initializer 320 may be separated into distinct instructions. For example, a combined size of the bootstrapper 310, predriver 315, and the DDR initializer 320 may be larger than 128 KB, which is the size of a memory of the processing core. In addition, the system memory such as DDR is not available yet when the boot operation is cold.

In some aspects, at block 330, the predriver 315 is loaded into SRAM and authenticated using a hash-based keyphrase. In one aspect, the predriver 315 is signed using a hash-based keyphase key (e.g., a Leighton-Micali Signatures (LMS), etc.), and the processor is configured to verify the authenticity of the keyphase key. After authenticating the predriver 315, the predriver 315 is configured to execute to create a secure connection to the secure enclave. For example, the predriver 315 may validate the authenticity of a secure enclave (e.g., a TPM) using a secure unique device identifier (SUDI) challenge/response. After authenticating the secure enclave, the predriver 315 establishes a secure tunnel with secure enclave using a random number generator (RNG) and key derivation function and retrieves the DDR initializer 320.

In some aspects, the DDR initializer 320 may also be signed, and the secure enclave may retrieve an authentication key for the DDR initializer 320 and validate the authenticity of the DDR initializer 320 at block 340. The DDR initializer 320 is then executed at block 340 to initialize the DDR memory. Although DDR memory is described, the initialized memory may be any suitable memory type. After block 340, the execution jumps back to the predriver 315 and the boot loader is loaded into the DDR memory, the bootloader is authenticated, and the operating system (OS) is loaded into memory to begin execution after the bootloader 325. In some aspects, the predriver 315 may also retrieve a key associated with the bootloader 325 from the secure enclave and validate the authenticity of the bootloader 325.

The diagram illustrated in FIG. 3 is conceptual and various modifications may be made. For example, in the descriptions above, the bootstrapper 310 and the predriver 315 may be combined. Various aspects are further described below.

FIGS. 4A to 4E illustrate a booting operation using a bootstrapper including a predriver in accordance with some aspects of the disclosure.

Figure 4A:
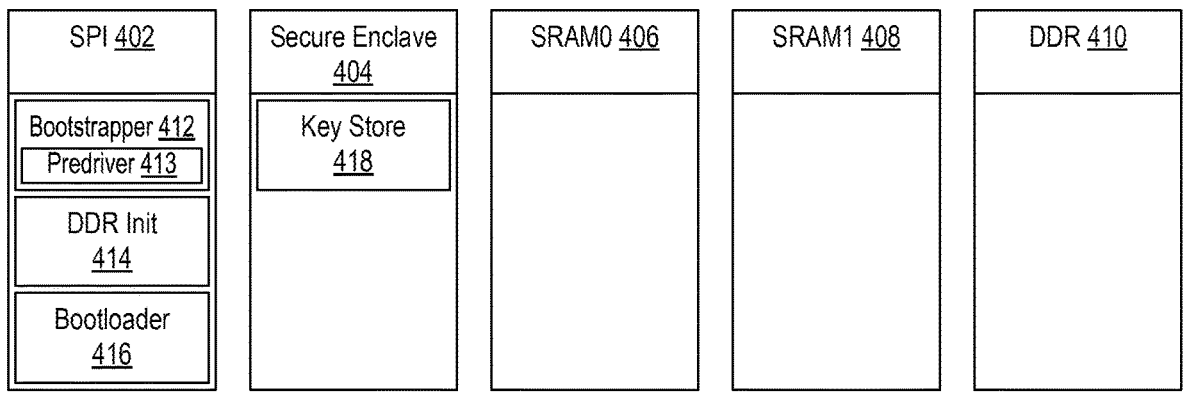
FIGS. 4A to 4E illustrate a booting operation using a bootstrapper including a predriver in accordance with some aspects of the disclosure.

As illustrated in FIG. 4A, the system may include a serial to peripheral interface (SPI) 402 that connects to a ROM storing a bootstrapper 412, and the bootstrapper includes a secure enclave predriver 413. In this case, DDR initializer 414 is separated from the bootstrapper 412. The system further includes a secure enclave 404 (e.g., a TPM, a TAM, etc.), SRAM0 406, SRAM1 408, and an external DDR memory 410. As described above, the processor may include separate SRAMs that have limited capacity, and the bootstrapping instructions may not fit entirely within a single SRAM. For example, the bootstrapper 412 and DDR initializer 414 may have a size larger than the SRAM0 406 and the SRAM1 408. The bootloader 416 may also have a size that is larger than the SRAM0 406 and the SRAM1 408. Accordingly, to boot the system, bootloader 416 must be loaded into the external DDR memory 410 before an OS may be booted.

Figure 4B:
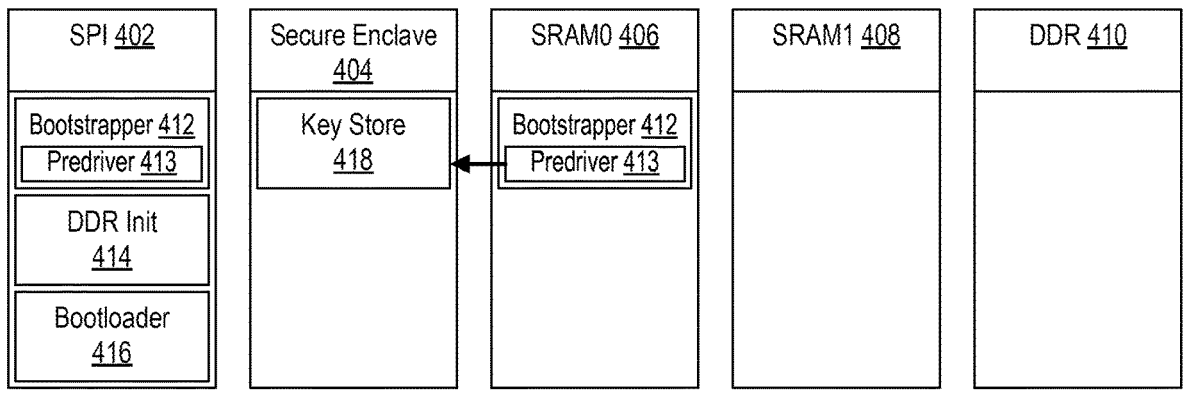

Initially, as shown in FIG. 4A, the external DDR memory 410 is uninitialized and SRAM0 406 and the SRAM1 408 are available for storing. Referring to FIG. 4B, a bootROM (not shown) includes instructions to initialize the system by copying the bootstrapper 412 including the predriver 413, into SRAM0 406. In some aspects, the bootstrapper 412 may be authenticated using a hash-based authentication key. The bootstrapper 412 is configured to execute the predriver 413 to establish a secure connection to the secure enclave 404, for example, using a SUDI challenge/response mechanism. In this case, the secure enclave 404 includes a key store 418 that stores a plurality of authentication keys for various components, such as the bootloader 416 and various firmware associated with the system. For example, the key store 418 may store authentication keys related to firmware that is loaded for an external interface such as a universal serial bus (USB) interface, a thunderbolt interface, a wireless network interface, etc.

Figure 4C:
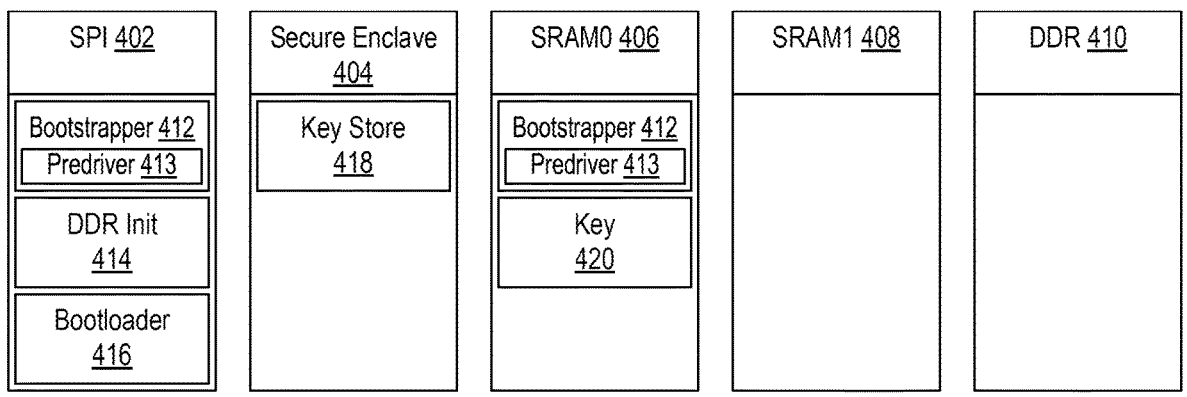
Figure 4D:
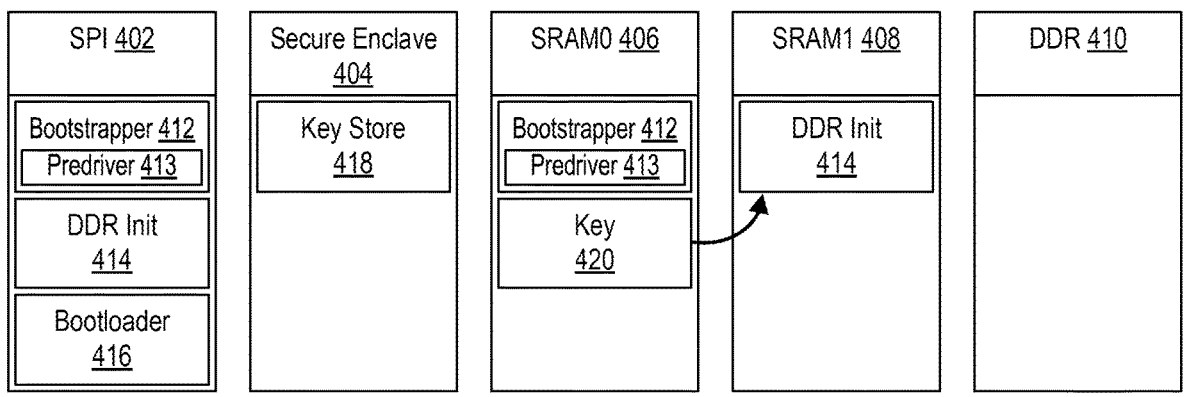

Referring to FIG. 4C, the predriver 413 execution continues and retrieves at least one key 420 from the key store 418 and stores the key 420 in SRAM0 406. In some cases, key 420 may only be copied directly into a register of the processor to reduce opportunities for key leakage. Referring to FIG. 4D, the predriver 413 execution continues and copies the DDR initializer 414 into the SRAM1 408. In this case, the size of the DDR initializer 414 cannot be loaded into SRAM0 406 because the size of the bootstrapper 412 and the DDR initializer 414 would exceed the size of the SRAM0 406. The secure enclave predriver 413 uses the key 420 to validate the authenticity of the DDR initializer 414.

In the event the DDR initializer 414 is authentic, the execution of the secure enclave predriver 413 passes to the DDR initializer 414 and the key 420 is unloaded from SRAM0 406. The DDR initializer 414 is configured to perform various functions to initialize the external DDR memory 410 and allow the external DDR memory 410 to be accessed from the processor.

Figure 4E:
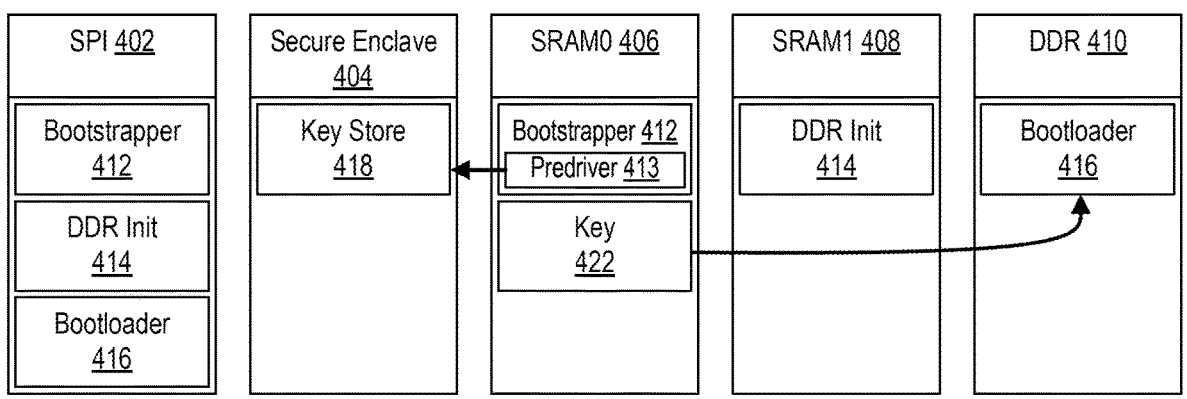

After the external DDR memory 410 is initialized, as shown in FIG. 4E, the DDR initializer 414 jumps back to the secure enclave predriver 413 and the secure enclave predriver 413 loads a key 422 corresponding to the bootloader 416, copies the bootloader 416 into the DDR initializer 414, and uses the key 422 to validate the authenticity of the bootloader 416. In the event the bootloader 416 is determined to be authentic, the secure enclave predriver 413 jumps to the bootloader 416 and begins execution. In this case, the bootloader 416 is configured to continue initialization of an operating system.

In some cases, the process illustrated in FIGS. 4A to 4E may also include various steps of initializing firmware are different stages to initialize different components, such as an interface to access non-volatile random access memory (NVRAM), which stores an OS and other components. In addition, the process illustrated in FIGS. 4A to 4E may also include various operations to unload the keys from SRAM1 408 and/or SRAM1 408 to prevent leakage of keys.

In some aspects, the boot operation of FIGS. 4A to 4E allow hierarchical keying and revocation of keys within the secure enclave 404. In the case of a key being leaked, existing keys in the secure enclave 404 may be revoked and new keys may be inserted, enabling dynamic replacement without the concern for limitations, overwriting of keys that were inadvertently included, and so forth.

FIGS. 5A to 5F illustrate a booting operation using a bootstrapper including a predriver in accordance with some aspects of the disclosure.

Figure 5A:
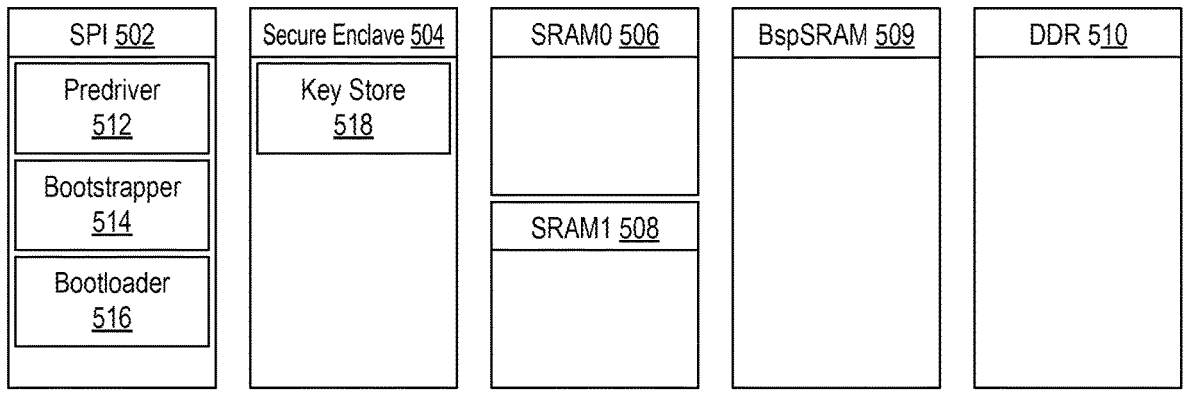
FIGS. 5A to 5F illustrate a booting operation using a bootstrapper including a predriver in accordance with some aspects of the disclosure.

As illustrated in FIG. 5A, the system may include an SPI 502 that connects to a ROM storing a predriver 512, the bootstrapper 514 that includes memory initializer instructions (e.g., the DDR initializer 414), and a bootloader 516. The system further includes a secure enclave 504 (e.g., a TPM, a TAM, etc.), SRAM0 506, SRAM1 408, a BspSRAM 509, which is a specialized memory that is secure, and an external DDR memory 510. As described above, the processor may include separate SRAMs that have limited capacity, and the bootstrapping instructions may not fit entirely within a single SRAM.

Figure 5B:
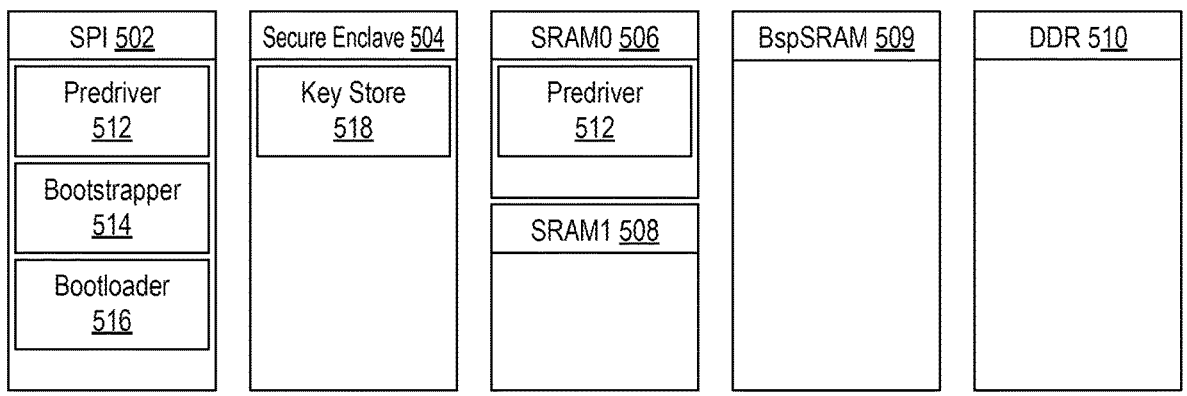

Initially, as shown in FIG. 5A, the external DDR memory 510 is uninitialized and SRAM0 506, the SRAM1 508, and the BspSRAM 509 are available for storing. Referring to FIG. 5B, a bootROM (not shown) includes instructions to initialize the system by copying the predriver 512 into SRAM0 506. In some aspects, the predriver 512 may be authenticated using a hash-based encryption key (e.g., an authentication key). After authentication of the predriver 512 as described above, the predriver 512 is executed to establish a secure connection to the secure enclave 504, for example, using a SUDI challenge/response mechanism. In this case, the secure enclave 504 includes a key store 518 that stores plurality of authentication keys for various components, such as the bootloader 516 and various firmware associated with the system. For example, the key store 518 may store authentication keys related to firmware that is loaded for an external interface such as a USB interface, a thunderbolt interface, a wireless network interface, etc.

Figure 5C:
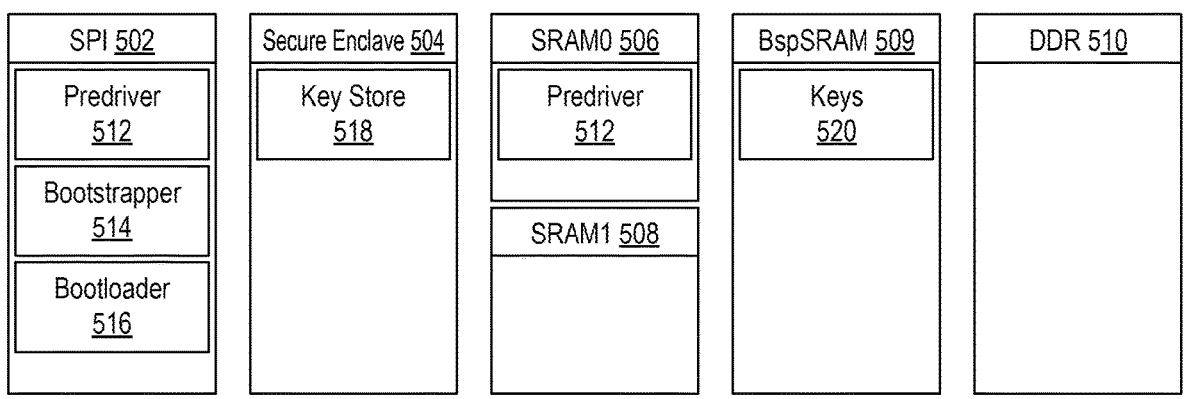
Figure 5D:
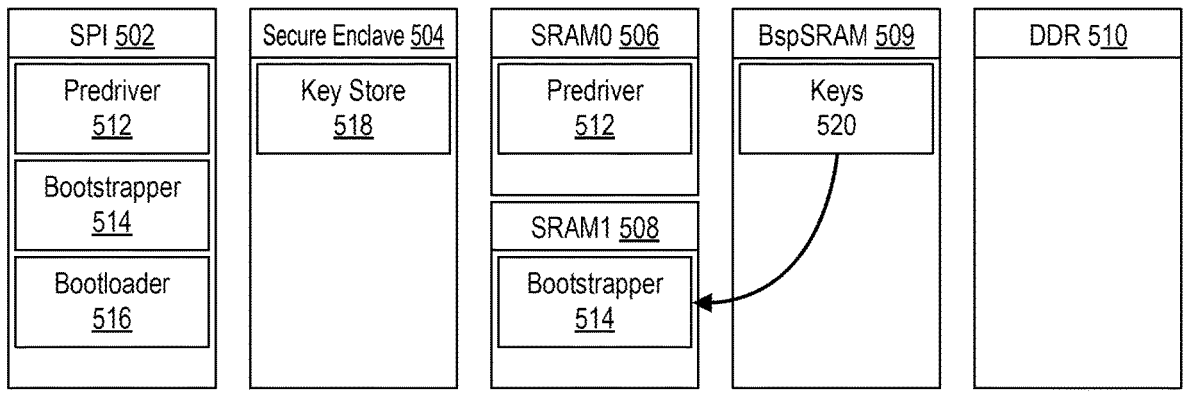

Referring to FIG. 5C, the predriver 512 execution continues and retrieves a plurality of keys 520 from the key store 518 and stores the key 520 in BspSRAM 509. In this case, BspSRAM 509 has limited access and may protect authentication keys from leakage. Referring to FIG. 5D, the predriver 512 execution continues and copies the bootstrapper 514 into the SRAM1 508. The predriver 512 uses the key 520 to validate the authenticity of the bootstrapper 514. In the event the bootstrapper 514 is authentic, the execution of the predriver 512 passes to the bootstrapper 514 and at least one key may be unloaded from the BspSRAM 509. The bootstrapper 514 is configured to perform various functions and includes memory initialization instructions that initialize the external DDR memory 510 and allow the external DDR memory 510 to be accessed from the processor.

Figure 5E:
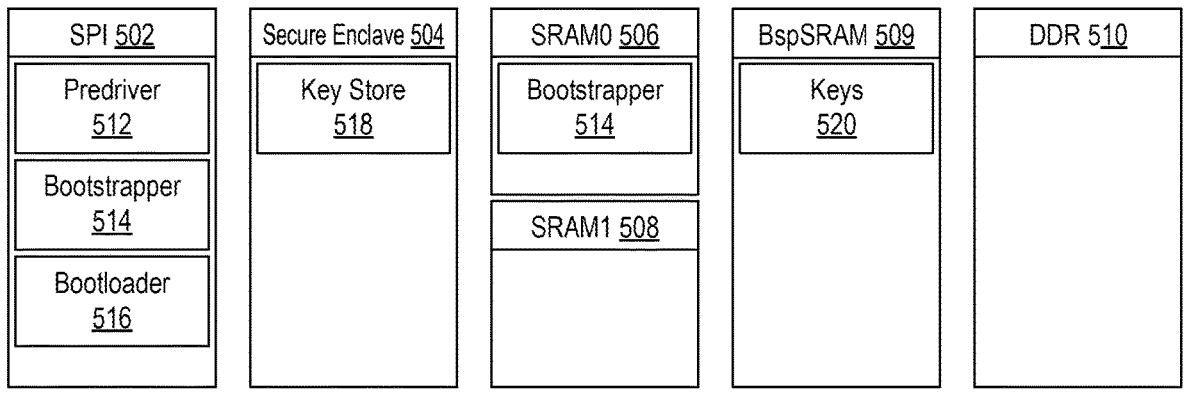
Figure 5F:
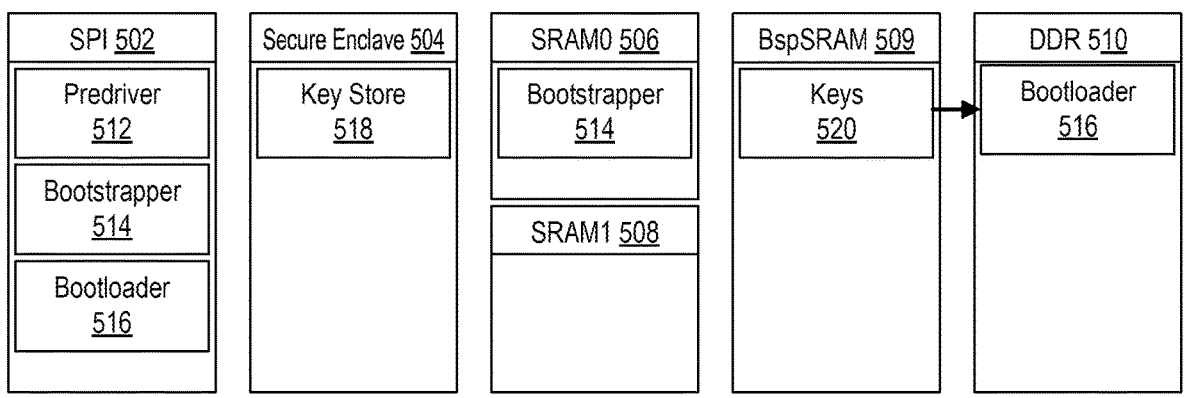

As shown in FIG. 5E, after authentication of the bootstrapper 514, the predriver 512 is unloaded from SRAM0 506 and the bootstrapper 514 begins execution. In one aspect, the bootstrapper 514 is copied into SRAM0 506 and copies the bootloader 516 into the external DDR memory 510. Referring to FIG. 5F, the bootstrapper 514 may access the keys 520 in BspSRAM 509 to validate the authenticity of the bootloader 516. After the bootloader 516 is authenticated, the system may continue a normal boot process such as loading the OS into the external DDR memory 510. In this case, the keys in the BspSRAM 509 are in a secured environment and cannot be directly accessed to ensure the integrity of the keys. In addition, due to the limited memory capacity of the various SRAMs of the processor, a complex and secure boot operation may be performed to maintain the integrity of the system.

Figure 6:
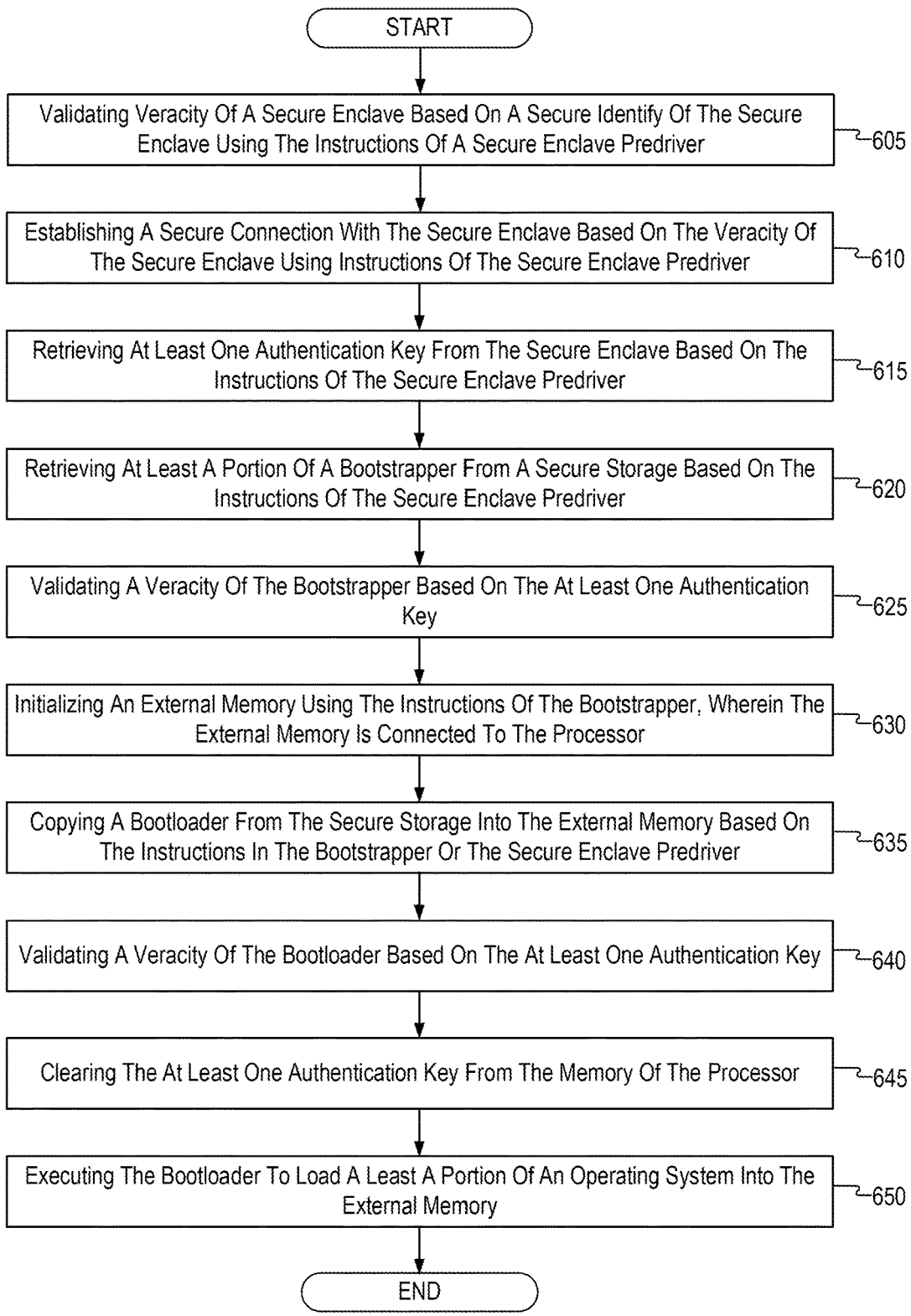
FIG. 6 illustrates an example method for securely booting a system using a secure enclave predriver.

FIG. 6 illustrates an example method for securely booting a system using a secure enclave predriver. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence. Although a computing device (e.g., using the SoC 800, etc.) is described as performing the method, this example is for descriptive purposes. The method may be performed in a distributed manner using cloud computing, various containers, microservices, and other techniques.

At block 605, the SoC (e.g., the SoC 800) may validate the veracity of a secure enclave based on a secure identify of the secure enclave using the instructions of a secure enclave predriver stored in a memory integral to a processor. In one aspect, the memory comprises a first memory (e.g., instruction memory) and a second memory (e.g., data memory). In another aspect, the memory comprises a third memory that is specialized and has limited accessibility (e.g., BgpSRAM) to provide additional security precautions. In some aspects, the secure enclave predriver is copied from BootROM and authenticated as described above.

At block 610, the SoC may establish a secure connection with the secure enclave based on the veracity of the secure enclave using instructions from the secure enclave predriver. For example, the SoC may perform a SUDI challenge/response to form a secure tunnel to the secure enclave.

At block 615, the SoC may retrieve at least one authentication key from the secure enclave based on the instructions of the secure enclave predriver. In one example, the SoC may retrieve an authentication key associated with memory initialization instructions, a bootstrapper, and a bootloader, as described above.

At block 620, the SoC may retrieve at least a portion of a bootstrapper from a secure storage based on the instructions of the secure enclave predriver. Various aspects are described above and include, for example, that the second portion of the bootstrapper is loaded into the second memory of the processor. In another aspect, the second authentication key is loaded after validation of at least the first portion of the bootstrapper, and the first portion of the bootstrapper may be loaded into the first memory of the processor. In another aspect, the second portion of the bootstrapper includes instructions to initialize the external memory. In some aspects, the first portion of the bootstrapper may be validated with a first key in the at least one authentication key, and the second portion of the bootstrapper is validated with a second authentication key. In other aspects, the secure enclave predriver may be loaded into the first memory of the processor, and the bootstrapper comprises a first portion and a second portion. In yet further aspects, the at least one authentication key includes a first key associated with the bootstrapper and a second key associated with the bootloader is stored in a separate memory associated with a secure register.

At block 625, the SoC may validate a veracity of the bootstrapper based on the at least one authentication key. In the case that veracity of the various components (e.g., the bootstrapper) fails, the failure indicates the system is compromised and any operations stop. The SoC may also remove the secure enclave predriver from the first memory after successful authentication.

At block 630 and after veracity is authenticated, the SoC may initialize an external memory using the instructions of the bootstrapper. The external memory is connected to the processor.

At block 635, the SoC may copy a bootloader from the secure storage into the external memory based on the instructions in the bootstrapper or the secure enclave predriver.

At block 640, the SoC may validate a veracity of the bootloader based on the at least one authentication key. At block 645, the SoC clears the at least one authentication key from the memory of the processor. At block 650, the SoC may execute the bootloader to load a least a portion of an operating system into the external memory. In some cases, a different processor may be configured to execute the bootloader.

In some aspects, the process illustrated in FIG. 6 may be implemented by various devices. In some aspects, the process is implemented in an SoC that may be implemented in various networking devices (e.g., network controllers, network switches, etc.) in various configurations. The process may also be implemented by a device that needs to securely bootstrap software instructions, such as a mobile device, a laptop, a medical device, etc.

Figure 7:
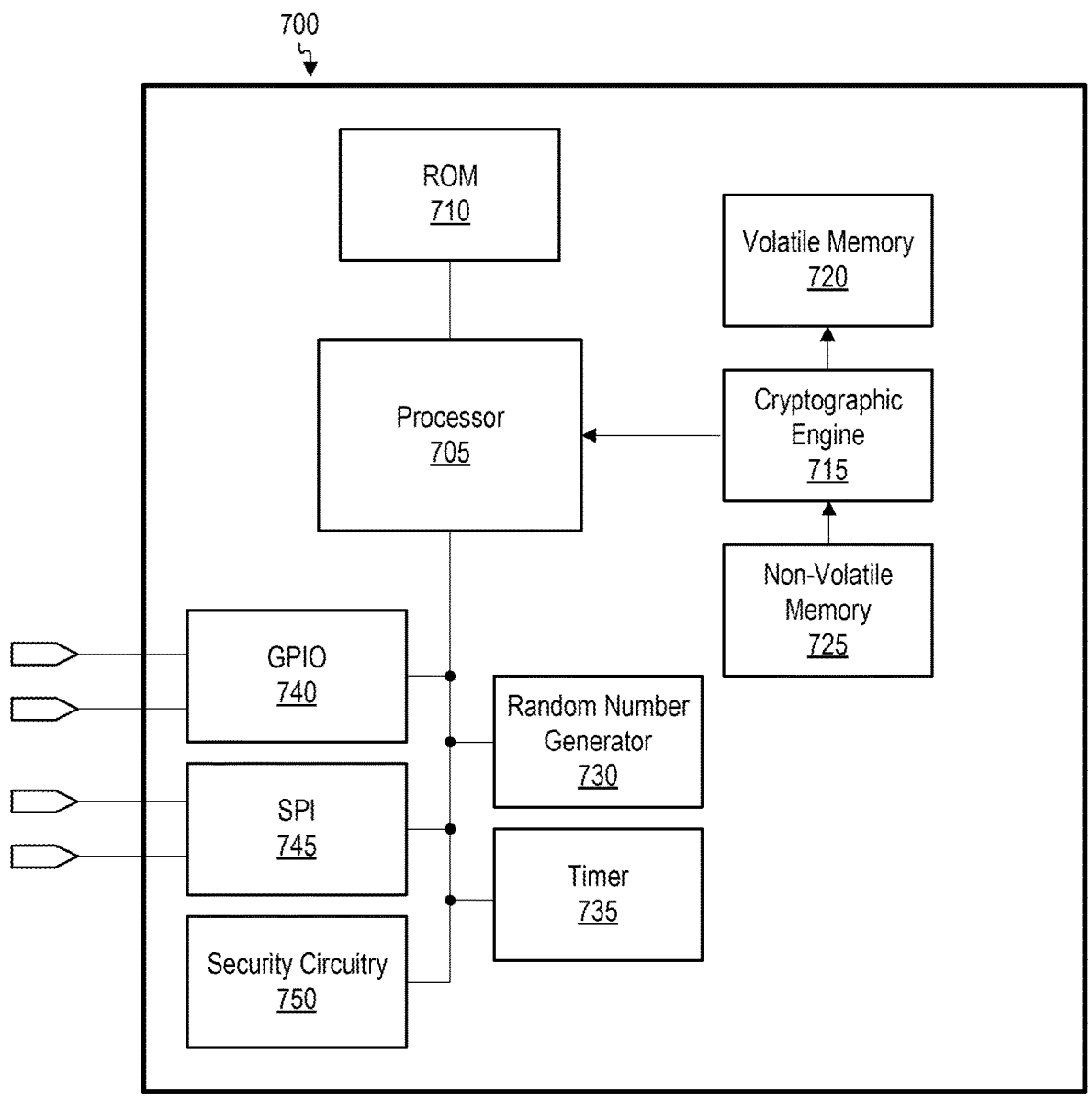
FIG. 7 illustrates an example block diagram of a TPM.

FIG. 7 illustrates an example block diagram of a TPM 700. The TPM 700 includes a processor 705 that cannot be accessed directly. The processor 705 is connected to a ROM program 710 that provides secure instructions to securely boot and operate the TPM 700.

The TPM 700 includes a cryptographic engine 715 that connects a volatile memory 720 (e.g., SRAM) and a non-volatile memory 725 (e.g., a flash memory) to the processor 705. The cryptographic engine 715 securely encrypts and decrypts data stored in either the volatile memory 720 or the non-volatile memory 725 and performs cryptographic hash functions and other iterative processes that may be performed by a dedicated hardware implementation. In the example illustrated in FIG. 7, the cryptographic engine 715 is placed in series with the volatile memory 720 or the non-volatile memory 725 to perform encryption and decryption before the data is received by the processor 705. In other examples, the cryptographic engine 715 may be placed in series so that the processor 705 fetches and stores encrypted data and calls the cryptographic engine 715 to decrypt or encrypt data directly within the processor 705. The volatile memory 720 and the non-volatile memory 725 are configured to be inaccessible outside of the TPM 700.

The TPM 700 also includes an RNG 730 that generates a sequence of numbers or symbols that cannot be reasonably predicted better than by a random chance. The RNG 730 may be implemented as a truly random hardware random-number generator to generate random numbers as a function of the current value of some physical environment attribute that is constantly changing in a manner that is practically impossible to model. The RNG 730 may also be a pseudo-random number generator and generates numbers that look random but are deterministic.

The TPM 700 also includes a timer 735 to perform timing functions in connection with various security functions (challenge/response) of the TPM $00. The TPM 700 also includes a general purpose input/output (GPIO) 740 for sending and receiving data. The TPM 700 also includes an SPI for sending and receiving data. In some cases, the SPI 745 may be configured in child mode that requires a parent SPI interface to provide instructions to control the communication interface.

The TPM 700 also includes security circuitry 750 to detect tampering and other anomalous events. For example, the security circuitry 750 may include voltage and temperature tampers, an active shield, and other physical security measures that would indicate that the TPM 700 is being physically altered. The security circuitry 750 cause the processor 705 to output information via GPIO 740 and SPI 745 to indicate that the TPM 700 was compromised and the TPM 700 cannot be trusted. The security circuitry 750 may also wipe sensitive data in a secure manner.

The TPM 700 is configured to perform power-on self-tests when booted or reset. First, the TPM 700 performs a self-test to verify the RNG 730 and secure hash algorithm (SHA) capabilities for secure boot operations. After self-test verification, the remaining tests verify the integrity of the remaining system components.

In addition, the TPM 700 may be configured in any number of devices that require a level of physical and digital security. For example, TPM 700 may be implemented by any device that requires physical and digital security (e.g., processors, logic circuits, networking equipment, mobile phones, tablet devices, flash memory devices, cryptographic authenticators, displays, printers, etc.).

Figure 8:
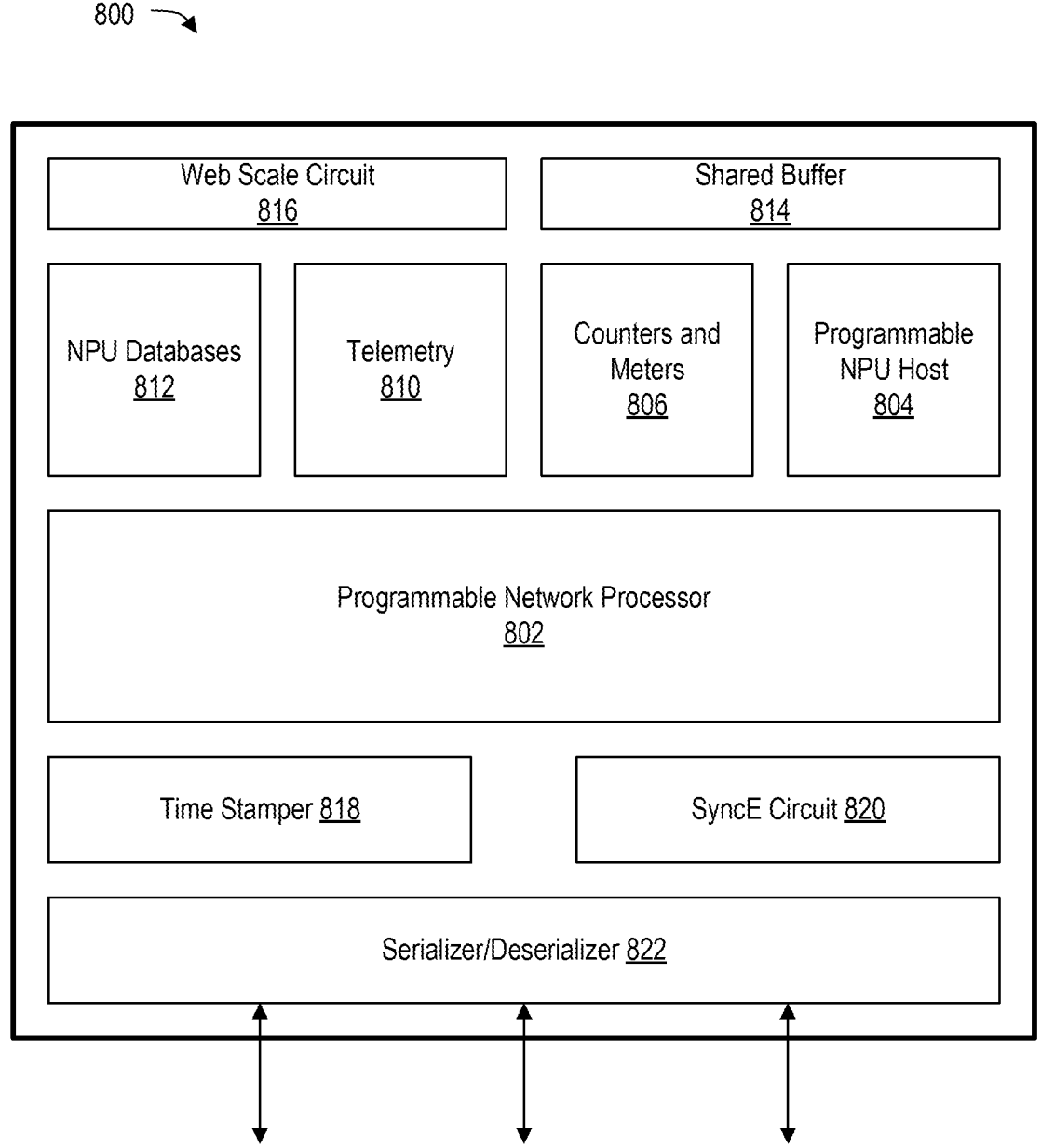
FIG. 8 illustrates a block diagram of an SoC 800 used in a network device to perform various functions in hardware in accordance with various aspects of the disclosure.

FIG. 8 illustrates a block diagram of an SoC 800 used in a network device to perform various functions in hardware in accordance with various aspects of the disclosure. For example, the SoC 800 may include fixed hardware components and programmable hardware components to perform various network tasks. In one illustrative aspect, the SoC 800 includes a programmable network processor 802 (e.g., an NPU, etc.), a programmable NPU host 804, counters and meters 806, telemetry 810, an NPU database 812, a shared buffer 814, a web scale circuit 816, a time stamper 818, a synchronous Ethernet (SyncE) circuit 820, and a serializer/deserializer 822.

The programmable network processor 802 may be programmed to perform functions that are conventionally performed by integrated circuits (IC) that are specific to switching, routing line card, and routing fabric. The programmable network processor 802 may be programmable using the programming protocol-independent packet processors (P4) language, which is a domain-specific programming language for network devices for processing packets. The programmable network processor 802 may have a distributed P4 NPU architecture that may execute at a line rate for small packets with complex processing. The programmable network processor 802 may also include optimized and shared NPU fungible tables. In some aspects, the programmable network processor 802 supports a unified software development kit (SDK) to provide consistent integrations across different network infrastructures and simplifies networking deployments. The SoC 800 may also include embedded processors to offload various processes, such as asynchronous computations.

The programmable network processor 802 includes a programmable NPU host 804 that may be configured to perform various management tasks, such as exception processing and control-plane functionality. In one aspect, the programmable NPU host 804 may be configured to perform high-bandwidth offline packet processing such as for example, operations, administration, and management (OAM) processing and media access control (MAC) learning.

The SoC 800 includes counters and meters 806 for traffic policing, coloring, and monitoring. As an example, the counters and meters 806 include programmable counters used for flow statistics and OAM loss measurements. The programmable counters may also be used for port utilization, microburst detection, delay measurements, flow tracking, elephant flow detection, congestion tracking, etc.

The telemetry 810 is configured to provide in-band telemetry information such as per-hop granular data in the forwarding plane. The telemetry 810 may observe changes in flow patterns caused by microbursts, packet transmission delay, latency per node, and new ports in flow paths. The NPU database 812 provides data storage for one or more devices, for example, the programmable network processor 802 and the programmable NPU host 804. The NPU database 812 may include different types of storage, such as key-value pair, block storage, etc.

In some aspects, the SoC 800 includes a shared buffer 814 that may be configured to buffer data, configurations, packets, and other content. The shared buffer 814 may be utilized by various components such as the programmable network processor 802 and the programmable NPU host 804. A web scale circuit 816 may be configured to dynamically allocate resources within the SoC 800 for scale, reliability, consistency, fault tolerance, etc.

In some aspects, the SoC 800 may also include a time of day (ToD) time stamper 818 and a SyncE circuit 820 for distributing a reference to subordinate devices. For example, the time stamper 818 may support IEEE-1588 for ToD functions. In some aspects, the time stamper 818 includes support for a precision timing protocol (PTP) for distributing frequency and/or phase to enable subordinate devices to synchronize with the SoC 800 for nano-second level accuracy.

The serializer/deserializer 822 is configured to serialize and deserialize packets into electrical signals and data. In one aspect, the serializer/deserializer 822 supports sending and receiving data using non-return-to-zero (NRZ) modulation or pulse amplitude modulation 4-level (PAM4) modulation. In one illustrative aspect, the hardware components of the SoC 800 provide features for terabit-level performance based on flexible port configuration, nanosecond-level timing, and programmable features. Non-limiting examples of hardware functions that the SoC 800 may support include internet protocol (IP) tunneling, multicast, network address translation (NAT), port address translation (PAT), security and quality of service (QOS) access control lists (ACLs), equal cost multiple path (ECMP), congestion management, distributed denial of service (DDos) migration using control plane policing, telemetry, timing and frequency synchronization, and so forth.

Figure 9:
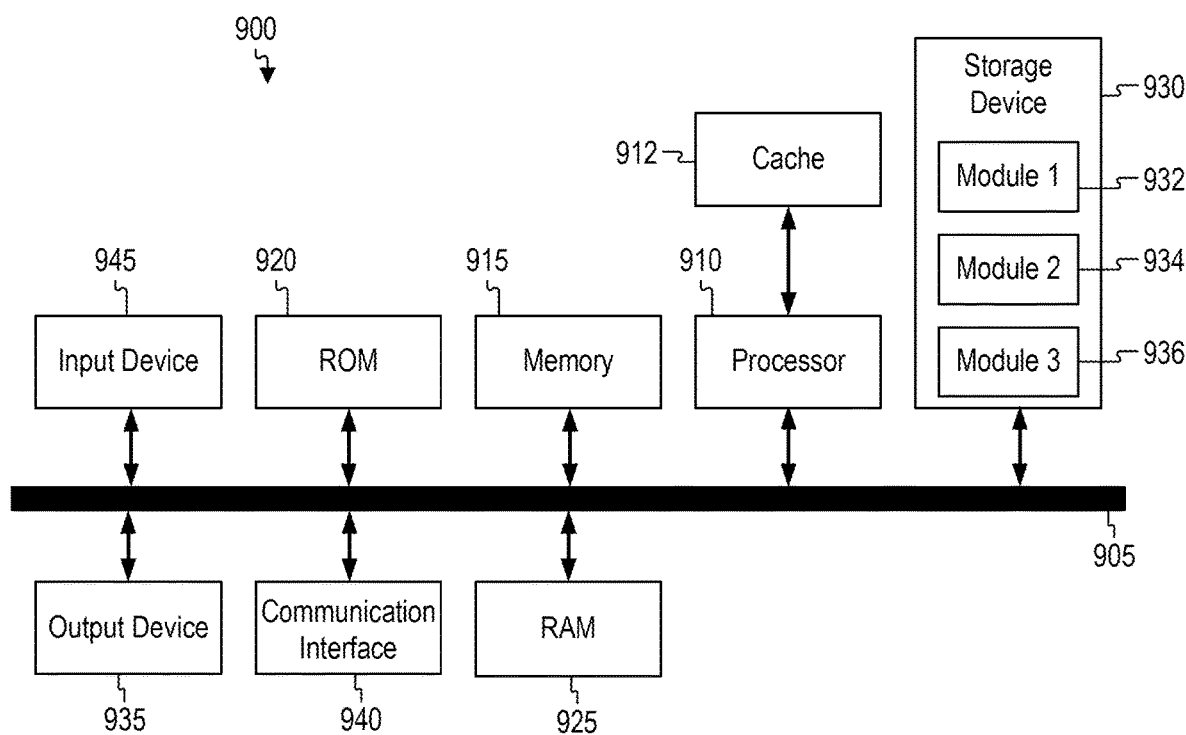
FIG. 9 shows an example of a computing system, which may be for example any computing device that may implement components of the system.

FIG. 9 shows an example of computing system 900, which may be for example any computing device making up the various roles described above or any component thereof in which the components of the system are in communication with each other using connection 905. Connection 905 may be a physical connection via a bus, or a direct connection to processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple datacenters, a peer network, etc. In some embodiments, one or more of the described system components represents many such components each performing some or all of the function for which the component is described. In some embodiments, the components may be physical or virtual devices.

Example system 900 includes at least one processing unit (CPU or processor) 910 and connection 905 that couples various system components including system memory 915, such as ROM 920 and RAM 925 to processor 910. Computing system 900 may include a cache of high-speed memory 912 connected directly with, in close proximity to, or integrated as part of processor 910.

Processor 910 may include any general purpose processor and a hardware service or software service, such as services 932, 934, and 936 stored in storage device 930, configured to control the processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms known to those of skill in the art. In some instances, multimodal systems may enable a user to provide multiple types of input/output to communicate with computing system 900. Computing system 900 may include communications interface 940, which may generally govern and manage the user input and system output. There is no restriction on operating on any particular hardware arrangement and therefore the basic features here may easily be substituted for improved hardware or firmware arrangements as they are developed.

Storage device 930 may be a non-volatile memory device and may be a hard disk or other types of computer readable media which may store data that are accessible by a computer, such as magnetic cassettes, flash memory cards, solid state memory devices, digital versatile disks, cartridges, RAM, ROM, and/or some combination of these devices.

The storage device 930 may include software services, servers, services, etc., that when the code that defines such software is executed by the processor 910, it causes the system to perform a function. In some embodiments, a hardware service that performs a particular function may include the software component stored in a computer-readable medium in connection with the necessary hardware components, such as processor 910, connection 905, output device 935, etc., to carry out the function.

Devices implementing methods according to these disclosures may comprise hardware, firmware and/or software, and may take any of a variety of form factors. Typical examples of such form factors include servers, laptops, smart phones, small form factor personal computers, personal digital assistants, and so on. Functionality described herein also may be embodied in peripherals or add-in cards. Such functionality may also be implemented on a circuit board among different chips or different processes executing in a single device, by way of further example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service may be software that resides in memory of a client device and/or one or more servers of a content management system and perform one or more functions when a processor executes the software associated with the service. In some embodiments, a service is a program, or a collection of programs that carry out a specific function. In some embodiments, a service may be considered a server. The memory may be a non-transitory computer-readable medium.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data which cause or otherwise configure a general-purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smartphones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

What is claimed is:

1. A method for securely configuring a booting operation, comprising:
    validating veracity of a secure enclave based on a secure identifier of the secure enclave using instructions of a secure enclave predriver stored in a memory integral to a processor;
    establishing a secure connection with the secure enclave based on the veracity of the secure enclave using the instructions of the secure enclave predriver;
    retrieving at least one authentication key from the secure enclave based on the instructions of the secure enclave predriver;
    retrieving at least a portion of a bootstrapper from a secure storage based on the instructions of the secure enclave predriver;
    validating a veracity of the bootstrapper based on the at least one authentication key;
    initializing an external memory using the instructions of the bootstrapper, wherein the external memory is connected to the processor;
    copying a bootloader from the secure storage into the external memory based on the instructions in the bootstrapper or the secure enclave predriver;
    validating a veracity of the bootloader based on the at least one authentication key;
    clearing the at least one authentication key from the memory of the processor; and
    executing the bootloader to load a least a portion of an operating system into the external memory.

2. The method of claim 1, wherein a different processor is configured to execute the bootloader.

3. The method of claim 1, wherein the memory comprises a first memory and a second memory.

4. The method of claim 3, wherein the bootstrapper comprises a first portion and a second portion, and
    wherein the first portion of the bootstrapper is loaded into the first memory of the processor, and the second portion of the bootstrapper is loaded in the second memory of the processor, and wherein the second portion of the bootstrapper includes instruction to initialize the external memory.

5. The method of claim 4, wherein the at least one authentication key is loaded into a third memory of the processor.

6. The method of claim 4, wherein the first portion of the bootstrapper is validated with a first key in the at least one authentication key and the second portion of the bootstrapper is validated with a second authentication key.

7. The method of claim 6, wherein the second authentication key is loaded after validation of at the first portion of the bootstrapper.

8. The method of claim 4, wherein the first portion of the bootstrapper and the second portion of the bootstrapper are loaded into the second memory of the processor, and the secure enclave predriver is loaded into the first memory of the processor.

9. The method of claim 3, further comprising:
    in response to validating the veracity of the bootstrapper, removing the secure enclave predriver from the first memory.

10. The method of claim 1, wherein the at least one authentication key includes a first key associated with the bootstrapper and a second key associated with the bootloader is stored in a separate memory associated with a secure register.

11. A system on chip (SoC), comprising:
    a processor including a memory integral to the processor and configured to execute instructions and cause the processor to:
        validate veracity of a secure enclave based on a secure identifier of the secure enclave using the instructions of a secure enclave predriver stored in a memory integral to the processor;
        establish a secure connection with the secure enclave based on the veracity of the secure enclave using instructions of the secure enclave predriver;
        retrieve at least one authentication key from the secure enclave based on the instructions of the secure enclave predriver;
        retrieve at least a portion of a bootstrapper from a secure storage based on the instructions of the secure enclave predriver;
        validate a veracity of the bootstrapper based on the at least one authentication key;
        initialize an external memory using the instructions of the bootstrapper, wherein the external memory is connected to the processor;
        copy a bootloader from the secure storage into the external memory based on the instructions in the bootstrapper or the secure enclave predriver;
        validate a veracity of the bootloader based on the at least one authentication key;
        clear the at least one authentication key from the memory of the processor; and
        execute the bootloader to load a least a portion of an operating system into the external memory.

12. The SoC of claim 11, wherein a different processor is configured to execute the bootloader.

13. The SoC of claim 11, wherein the memory comprises a first memory and a second memory.

14. The SoC of claim 13, wherein the bootstrapper comprises a first portion and a second portion, and wherein the first portion of the bootstrapper is loaded into the first memory of the processor, and the second portion of the bootstrapper is loaded in the second memory of the processor, and wherein the second portion of the bootstrapper includes instruction to initialize the external memory.

15. The SoC of claim 14, wherein the at least one authentication key is loaded into a third memory of the processor.

16. The SoC of claim 14, wherein the first portion of the bootstrapper is validated with a first key in the at least one authentication key and the second portion of the bootstrapper is validated with a second authentication key.

17. The SoC of claim 16, wherein the second authentication key is loaded after validation of at the first portion of the bootstrapper.

18. The SoC of claim 14, wherein the first portion of the bootstrapper and the second portion of the bootstrapper are loaded into the second memory of the processor, and the secure enclave predriver is loaded into the first memory of the processor.

19. The SoC of claim 13, wherein the processor is configured to execute the instructions and cause the processor to:
   in response to validating the veracity of the bootstrapper, remove the secure enclave predriver from the first memory.

20. The SoC of claim 11, wherein the at least one authentication key includes a first key associated with the bootstrapper and a second key associated with the bootloader is stored in a separate memory associated with a secure register.

* * * * *